(12) United States Patent
Akashi et al.

(10) Patent No.: US 12,184,118 B2
(45) Date of Patent: Dec. 31, 2024

(54) BACKUP POWER SUPPLY CONTROL SYSTEM, BACKUP POWER SUPPLY SYSTEM, AND MOVING VEHICLE

(71) Applicant: Panasonic Intellectual Property Management Co., Ltd., Osaka (JP)

(72) Inventors: Hiroki Akashi, Osaka (JP); Masafumi Nakamura, Osaka (JP); Masatoshi Nakase, Osaka (JP); Yuta Nagatomi, Osaka (JP); Kinya Kato, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 15 days.

(21) Appl. No.: 18/257,816

(22) PCT Filed: Dec. 20, 2021

(86) PCT No.: PCT/JP2021/047004
§ 371 (c)(1),
(2) Date: Jun. 15, 2023

(87) PCT Pub. No.: WO2022/145271
PCT Pub. Date: Jul. 7, 2022

(65) Prior Publication Data
US 2024/0106265 A1    Mar. 28, 2024

(30) Foreign Application Priority Data
Dec. 28, 2020    (JP) .................................. 2020-218539

(51) Int. Cl.
*B60R 16/033*    (2006.01)
*H02J 7/00*    (2006.01)
(Continued)

(52) U.S. Cl.
CPC ............ *H02J 9/068* (2020.01); *B60R 16/033* (2013.01); *H02J 7/0068* (2013.01); *H02J 7/345* (2013.01);
(Continued)

(58) Field of Classification Search
CPC .......... H02J 9/068; H02J 7/0068; H02J 7/345; H02J 9/061; H02J 2207/50; H02J 2310/48; H02J 7/34; H02J 9/06; B60R 16/033
(Continued)

(56) References Cited

U.S. PATENT DOCUMENTS

2007/0273212 A1* 11/2007 Henkel ..................... H02J 9/06
307/66

FOREIGN PATENT DOCUMENTS

| JP | H02-060435 A | 2/1990 |
| JP | H05-276688 A | 10/1993 |

(Continued)

OTHER PUBLICATIONS

International Search Report dated Mar. 8, 2022 issued in International Patent Application No. PCT/JP2021/047004, with English translation.

*Primary Examiner* — Elim Ortiz
(74) *Attorney, Agent, or Firm* — Rimon P.C.

(57) ABSTRACT

A backup power supply control system includes: a first semiconductor switch that switches a main power supply line to an electrically conductive state or an electrically non-conductive state; and an auxiliary power supply switch that switches an auxiliary power supply line to the electrically conductive state or the electrically non-conductive state. A first driving unit controls, in a non-failure state, a second semiconductor switch, connected between a gate and source of a first semiconductor switch, OFF and thereby
(Continued)

controls the first semiconductor switch ON. The first driving unit ensures, in the failure state, at least a gate-plateau voltage of the first semiconductor switch as a drive voltage for the second semiconductor switch. When a failure detection unit detects the failure state, the first driving unit controls the first semiconductor switch OFF by controlling the second semiconductor switch ON and a second driving unit controls the auxiliary power supply switch ON.

20 Claims, 4 Drawing Sheets

(51) Int. Cl.
  *H02J 7/34* (2006.01)
  *H02J 9/06* (2006.01)
(52) U.S. Cl.
  CPC .......... *H02J 9/061* (2013.01); *H02J 2207/50* (2020.01); *H02J 2310/48* (2020.01)
(58) Field of Classification Search
  USPC ............... 307/38, 125, 126, 139, 140, 150; 361/93.1; 365/226; 320/134
  See application file for complete search history.

(56) References Cited

FOREIGN PATENT DOCUMENTS

| | | |
|---|---|---|
| JP | 2007-082374 A | 3/2007 |
| JP | 6407381 B1 | 10/2018 |
| JP | 2020-005481 A | 1/2020 |
| WO | 2005/104329 A1 | 11/2005 |
| WO | 2020/008732 A1 | 1/2020 |

* cited by examiner

BACKUP POWER SUPPLY CONTROL SYSTEM, BACKUP POWER SUPPLY SYSTEM, AND MOVING VEHICLE

CROSS-REFERENCE OF RELATED APPLICATIONS

This application is the U.S. National Phase under 35 U.S.C. § 371 of International Patent Application No. PCT/JP2021/047004, filed on Dec. 20, 2021, which in turn claims the benefit of Japanese Patent Application No. 2020-218539, filed on Dec. 28, 2020, the entire disclosures of which Applications are incorporated by reference herein.

TECHNICAL FIELD

The present disclosure generally relates to a backup power supply control system, a backup power supply system, and a moving vehicle. More particularly, the present disclosure relates to a backup power supply control system, a backup power supply system, and a moving vehicle, all of which are configured to supply power from an auxiliary power supply to a load when a main power supply has caused a failure.

BACKGROUND ART

A boosting power supply circuit of Patent Literature 1 supplies, when power stops being delivered from a battery, power from a lithium-ion battery as a backup power supply to various types of loads. The boosting power supply circuit boosts a DC voltage of the lithium-ion battery and supplies the voltage thus boosted to the various types of loads.

CITATION LIST

Patent Literature

Patent Literature 1: JP 2020-5481 A

SUMMARY OF INVENTION

In the boosting power supply circuit of Patent Literature 1, when the battery (main power supply) has caused a failure, power is supplied from the lithium-ion battery (auxiliary power supply) to the loads. To prevent the power supplied from the lithium-ion battery from flowing back toward the battery, a MOSFET connected between the battery and the load is turned OFF. The MOSFET has parasitic capacitance between its gate and source. Thus, it may take so long a time to turn the MOSFET OFF that it would cause a significant delay in turning the MOSFET connected between the battery and the loads from ON to OFF when the battery has caused a failure. If such a significant delay is caused in turning the MOSFET OFF when the battery has caused a failure, then the start of supply of power from the lithium-ion battery to the loads would also be delayed significantly.

It is therefore an object of the present disclosure to provide a backup power supply control system, a backup power supply system, and a moving vehicle, all of which are configured to shorten the time it takes to make power suppliable from an auxiliary power supply to a load when a main power supply has caused a failure.

A backup power supply control system according to an aspect of the present disclosure includes a first semiconductor switch, an auxiliary power supply switch, a failure detection unit, a first driving unit, and a second driving unit. The first semiconductor switch switches a main power supply line, connecting a main power supply to a load, to either an electrically conductive state or an electrically non-conductive state. The auxiliary power supply switch switches an auxiliary power supply line, connecting an auxiliary power supply to the load, to either the electrically conductive state or the electrically non-conductive state. The failure detection unit determines whether the main power supply is in a failure state or a non-failure state. The first driving unit controls, in the non-failure state, the first semiconductor switch ON and controls, in the failure state, the first semiconductor switch OFF. The second driving unit controls, in the non-failure state, the auxiliary power supply switch OFF and controls, in the failure state, the auxiliary power supply switch ON. The first semiconductor switch is an MISFET. The first driving unit includes: a voltage divider circuit that divides a voltage on the main power supply line and applies the voltage thus divided to between a gate and source of the first semiconductor switch; and a second semiconductor switch connected between the gate and source of the first semiconductor switch. When the failure detection unit detects the non-failure state, the first driving unit controls the second semiconductor switch OFF and thereby controls the first semiconductor switch ON. The first driving unit ensures, in the failure state, at least a gate-plateau voltage of the first semiconductor switch as a drive voltage for the second semiconductor switch. When the failure detection unit detects the failure state, the first driving unit controls the second semiconductor switch ON and thereby controls the first semiconductor switch OFF.

A backup power supply system according to another aspect of the present disclosure includes the backup power supply control system described above and the auxiliary power supply. The backup power supply control system makes power suppliable from the auxiliary power supply to the load when the main power supply is in the failure state.

A moving vehicle according to still another aspect of the present disclosure includes the backup power supply system described above and a moving vehicle body. The moving vehicle body is to be equipped with the backup power supply system and the load.

The present disclosure enables shortening the time it takes to make power suppliable from an auxiliary power supply to a load when a main power supply has caused a failure.

DESCRIPTION OF EMBODIMENTS

Embodiment

(1) Overview

The drawings to be referred to in the following description of embodiments are all schematic representations. Thus, the ratio of the dimensions (including thicknesses) of respective constituent elements illustrated on the drawings does not always reflect their actual dimensional ratio.

A backup power supply control system 10 according to an exemplary embodiment and a backup power supply system 1 including the same will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from a true spirit and scope of the present disclosure.

Figure 4:
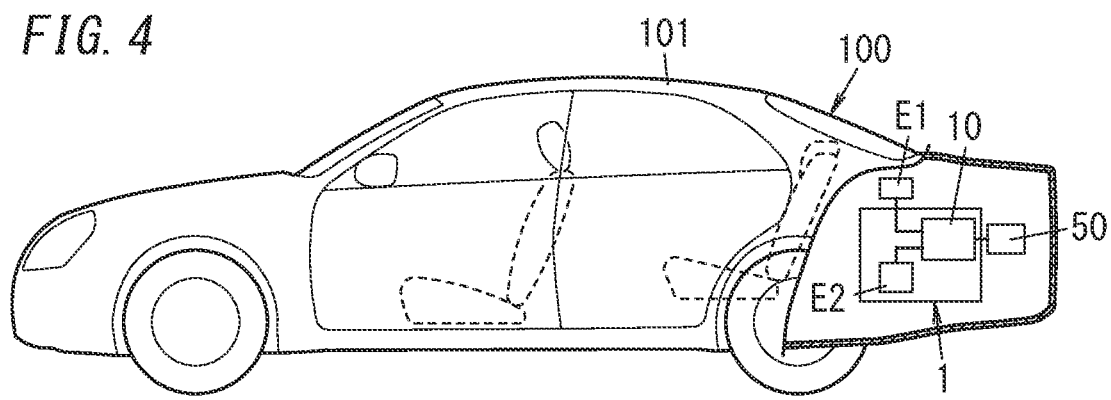
FIG. 4 is a partially cutaway side view of a vehicle equipped with the backup power supply system.

The backup power supply system 1 may be installed in, for example, a vehicle 100 (refer to FIG. 4). If a main power supply E1 installed in the vehicle 100 has caused a failure, the backup power supply system 1 is used to supply power from an auxiliary power supply E2 to a load 50. This allows the load 50 to operate continuously with the power supplied from the auxiliary power supply E2 even if the main power supply E1 has caused a failure. As used herein, the "failure state" in which the main power supply E1 has caused a failure refers to a situation where the supply of power from the main power supply E1 to the load 50 is discontinued due to, for example, either a failure or deterioration of the main power supply E1 or disconnection or short-circuit of a line connecting the main power supply E1 to the load 50. Note that the state where the "supply of power is discontinued" may refer to not only a state where the output voltage V1 delivered from the main power supply E1 to the load 50 becomes zero but also a state where the output voltage V1 of the main power supply E1 becomes lower than a minimum guaranteed operating voltage of the load 50. Also, a "non-failure state" of the main power supply E1 refers to not only a state where power is supplied from the main power supply E1 to the load 50 but also a state where the output voltage V1 delivered from the main power supply E1 to the load 50 is equal to or higher than the minimum guaranteed operating voltage of the load 50.

A backup power supply control system 10 according to this embodiment includes a first semiconductor switch Q1, an auxiliary power supply switch Q5, a failure detection unit 11, a first driving unit 12, and a second driving unit 13.

The first semiconductor switch Q1 makes a main power supply line LN1, connecting the main power supply E1 to the load 50, either electrically conductive or electrically non-conductive.

The auxiliary power supply switch Q5 makes an auxiliary power supply line LN2, connecting the auxiliary power supply E2 to the load 50, either electrically conductive or electrically non-conductive.

The failure detection unit 11 determines whether the main power supply E1 is in the failure state or the non-failure state.

The first driving unit 12 controls the first semiconductor switch Q1 ON in the non-failure state and controls the first semiconductor switch Q1 OFF in the failure state.

The second driving unit 13 controls the auxiliary power supply switch Q5 OFF in the non-failure state and controls the auxiliary power supply switch Q5 ON in the failure state.

The first semiconductor switch Q1 is a metal-insulator semiconductor field effect transistor (MISFET).

The first driving unit 12 includes: a voltage divider circuit 15 that divides a voltage on the main power supply line LN1 (i.e., the output voltage V1 of the main power supply E1) and applies the voltage thus divided to between a gate and source of the first semiconductor switch Q1; and a second semiconductor switch Q2 connected between the gate and source of the first semiconductor switch Q1.

When the failure detection unit 11 detects the non-failure state, the first driving unit 12 controls the second semiconductor switch Q2 OFF and thereby controls the first semiconductor switch Q1 ON.

The first driving unit 12 ensures, in the failure state, at least a gate-plateau voltage of the first semiconductor switch Q1 as a drive voltage for the second semiconductor switch Q2.

When the failure detection unit 11 detects the failure state, the first driving unit 12 controls the second semiconductor switch Q2 ON and thereby controls the first semiconductor switch Q1 OFF.

Figure 1:
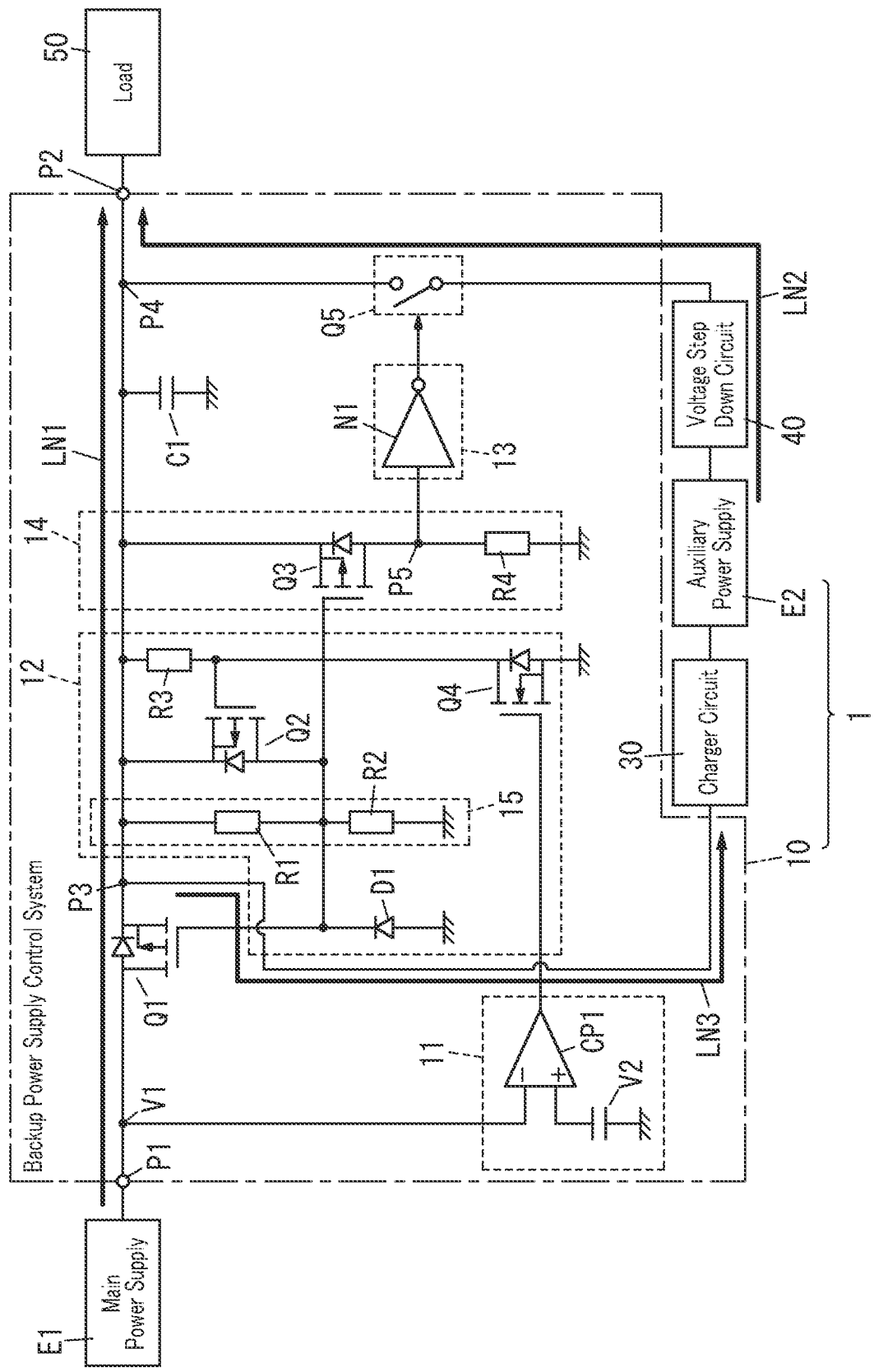
FIG. 1 is a schematic circuit diagram of a backup power supply control system according to an exemplary embodiment of the present disclosure and a backup power supply system including the backup power supply control system.
Figure 2:
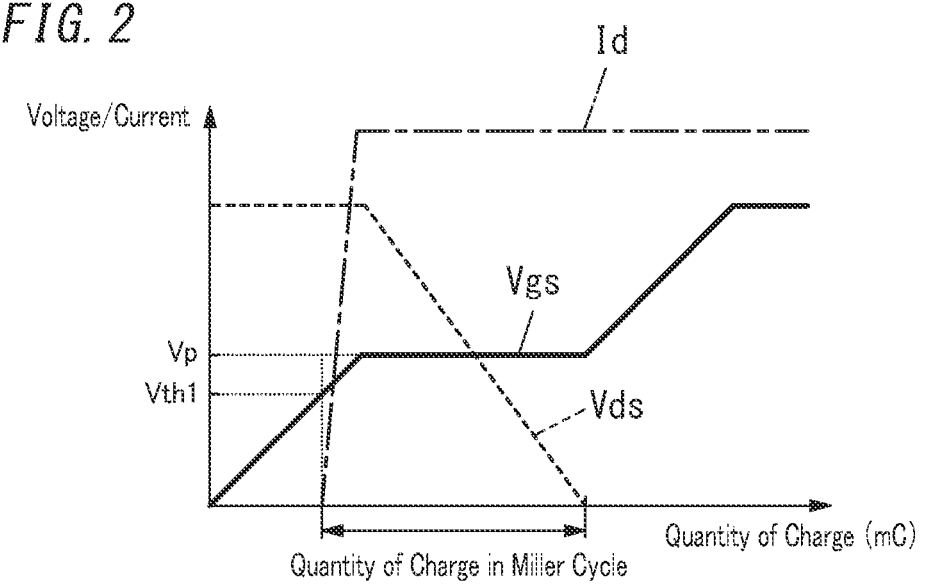
FIG. 2 illustrates a gate-source voltage Vgs, a drain-source voltage Vds, and a drain current Id of a first semiconductor switch included in the backup power supply control system.
Figure 3:
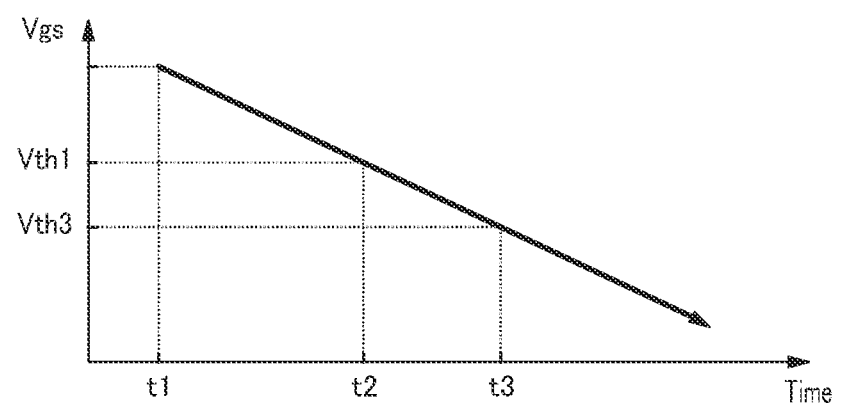
FIG. 3 illustrates a gate-source voltage Vgs of first and third semiconductor switches included in the backup power supply control system when a main power supply is in a failure state.

To control the first semiconductor switch Q1 OFF in a situation where the main power supply E1 has caused a failure, the second semiconductor switch Q2 needs to be controlled ON. When a line connecting the main power supply E1 to the backup power supply control system 10 is short-circuited, a drive voltage needs to be ensured for the second semiconductor switch Q2 as well. FIG. 2 shows how a gate-source voltage Vgs, a drain-source voltage Vds, and a drain current Id change when a constant current is applied to the gate of the first semiconductor switch Q1 implemented as an MISFET. When the gate-source voltage Vgs exceeds a threshold voltage Vth1 with the constant current applied to the gate of the first semiconductor switch Q1, the drain current Id starts to flow. Then, when the gate-source voltage Vgs reaches a gate-plateau voltage Vp, the drain current Id becomes saturated to cause the drain-source voltage Vds to start decreasing. When the first semiconductor switch Q1 is turned ON completely, there will be no Miller effects any longer to make the rising edge of the gate-source voltage Vgs steeper.

In this case, in a situation where the electric charge stored in a gate capacitance of the first semiconductor switch Q1 is released when the main power supply E1 is short-circuited, as the quantity of the electric charge stored in the gate capacitance decreases, the gate-source voltage Vgs of the first semiconductor switch Q1 falls. In the meantime, in some period, the gate-source voltage Vgs becomes substantially constant at the gate-plateau voltage Vp. According to this embodiment, even if the main power supply E1 is short-circuited, the first driving unit 12 ensures at least the gate-plateau voltage Vp as a drive voltage for the second semiconductor switch Q2, thus enabling controlling the second semiconductor switch Q2 ON. Optionally, the first driving unit 12 may ensure, as the drive voltage for the second semiconductor switch Q2, not only the gate-plateau voltage Vp of the first semiconductor switch Q1 but also a residual voltage generated in the capacitive component of the load 50 as well. In addition, the backup power supply control system 10 further includes a capacitor C1 connected between an electrical path leading from the first semiconductor switch Q1 to the load 50 on the main power supply line LN1 and the reference potential. The capacitor C1 may be, for example, an electrolytic capacitor. The first driving unit 12 may use the residual voltage of the capacitor C1 as a drive voltage for the second semiconductor switch Q2. This enables, even if the main power supply E1 has caused a failure, short-circuiting the gate and source of the first semiconductor switch Q1 and thereby turning the first semiconductor switch Q1 from ON to OFF by making the first driving unit 12 control the second semiconductor switch Q2 ON using at least the gate-plateau voltage Vp of the first semiconductor switch Q1 as a drive voltage.

Meanwhile, a driver circuit, in which a first resistor and a second resistor are connected between the gate and source of the first semiconductor switch Q1 and a switch is connected between a connection node of the first and second resistors and the reference potential, turns the first semiconductor switch Q1 OFF by turning the switch OFF and thereby causing the electric charge stored in the gate capacitance of the first semiconductor switch Q1 to be transferred into the first and second resistors. In that case, the time it takes to turn the first semiconductor switch Q1 OFF (hereinafter referred to as a "turn OFF time") is determined by the gate capacitance of the first semiconductor switch Q1 and the discharge time constant of the first and second resistors between the gate and source. Thus, chances are the turn OFF time becomes too long. Nevertheless, if the resistance value of the first and second resistors between the gate and source is decreased to reduce the discharge time constant, then a dark current flowing through a resistor connected between the source and the reference potential in the non-failure state increases.

In contrast, the first driving unit 12 according to this embodiment controls the first semiconductor switch Q1 OFF by controlling the second semiconductor switch Q2 ON and short-circuiting the gate and source of the first semiconductor switch Q1 with the second semiconductor switch Q2. Then, the electric charge stored in the gate capacitance of the first semiconductor switch Q1 will be transferred in a short time via the second semiconductor switch Q2, thus enabling shortening the time it takes to turn the first semiconductor switch Q1 OFF since the main power supply E1 has caused a failure. This enables providing a backup power supply control system 10 with the ability to shorten the time it takes to make power suppliable from the auxiliary power supply E2 to the load 50 when the main power supply E1 has caused a failure. In addition, even if the impedance of the voltage divider circuit 15 is set at a high value, the time it takes to turn the first semiconductor switch Q1 from ON to OFF will not be affected. Thus, the dark current may be reduced by setting the impedance of the voltage divider circuit 15 at a high value.

Also, the backup power supply system 1 according to this embodiment includes the backup power supply control system 10 and the auxiliary power supply E2. The backup power supply control system 10 makes power suppliable from the auxiliary power supply E2 to the load 50 when the main power supply E1 falls into the failure state.

Furthermore, the backup power supply system 1 according to this embodiment is installed in a moving vehicle (such as the vehicle 100) including the load 50 (refer to FIG. 4). That is to say, the vehicle 100 as an exemplary moving vehicle includes the backup power supply system 1 described above and a body 101 as a moving vehicle body. The body 101 is equipped with the backup power supply system 1 and the load 50.

In the following description of embodiments, a situation where the backup power supply system 1 is installed in the vehicle 100 such as an automobile will be described as an example. However, this is only an example and should not be construed as limiting. Alternatively, the backup power supply system 1 may also be installed in any other suitable type of moving vehicle (such as an aircraft, a watercraft, or a railway train), instead of the vehicle 100. In this case, the vehicle 100 includes a plurality of loads 50 to be supplied with power from the auxiliary power supply E2 when the main power supply E1 has caused a failure. Examples of the plurality of loads 50 include electric actuators (such as a braking system and a power steering system) and a control circuit (electronic control unit (ECU)) for controlling the actuators.

(2) Details

A backup power supply control system 10 according to an exemplary embodiment and a backup power supply system 1 including the same will now be described in detail with reference to the accompanying drawings.

(2.1) Configuration

Next, respective constituent elements of the backup power supply system 1 will be described in detail.

As described above, the backup power supply system 1 includes the backup power supply control system 10 and the auxiliary power supply E2.

The backup power supply control system 10 includes: an input terminal P1 to which the main power supply E1 is electrically connected; and an output terminal P2, to which the load 50 is electrically connected. In addition, the backup power supply control system 10 further includes the first semiconductor switch Q1, the second semiconductor switch Q2, the auxiliary power supply switch Q5, the failure detection unit 11, the first driving unit 12, the second driving unit 13, and the ON/OFF detection unit 14 as described above.

When the main power supply E1 is causing no failure (i.e., in the non-failure state), the backup power supply control system 10 supplies the output power of the main power supply E1 to the load 50. That is to say, in the non-failure state, the backup power supply control system 10 switches the main power supply line LN1, connecting the main power supply E1 to the load 50, to an electrically conductive state and also switches the auxiliary power supply line LN2, connecting the auxiliary power supply E2 to the load 50, to an electrically non-conductive state.

Meanwhile, in a state where the main power supply E1 has caused a failure (i.e., in the failure state), the backup power supply control system 10 makes power suppliable from the auxiliary power supply E2, instead of the main power supply E1, to the load 50. That is to say, in the failure state, the backup power supply control system 10 switches the main power supply line LN1 to the electrically non-conductive state and switches the auxiliary power supply line LN2 to the electrically conductive state.

In this embodiment, the main power supply E1 may be, for example, a 12V or 24V battery installed in the vehicle 100. The auxiliary power supply E2 is a chargeable and dischargeable electrical storage device. The auxiliary power supply E2 is charged, in the non-failure state, by the main power supply E1 and supplies, in the failure state, power to the load 50 instead of the main power supply E1. In this embodiment, the auxiliary power supply E2 includes an electrical storage device such as an electrical double layer capacitor. Alternatively, the auxiliary power supply E2 may also include an electrical storage device such as a lithium-ion battery or a nickel-hydrogen battery.

The main power supply line LN1 is an electrical path for supplying the output power of the main power supply E1 to the load 50. The backup power supply control system 10 includes a part of the main power supply line LN1. The first semiconductor switch Q1 is electrically connected between the input terminal P1 and the output terminal P2.

The auxiliary power supply line LN2 is an electrical path for supplying the output power of the auxiliary power supply E2 to the load 50. A charger circuit 30 for charging the auxiliary power supply E2 is connected to branch line LN3 branching from a branch node P3 between the first semiconductor switch Q1 and the output terminal P2 on the main power supply line LN1. The charger circuit 30 charges the auxiliary power supply E2 with the power supplied from the main power supply E1. In addition, the auxiliary power supply line LN2 is connected to the main power supply line LN1 at a confluent node P4 between the branch node P3 and the output terminal P2 on the main power supply line LN1. On the auxiliary power supply line LN2, a voltage step down circuit 40 is connected between the auxiliary power supply E2 and the auxiliary power supply switch Q5. The voltage step down circuit 40 transforms the output voltage of the auxiliary power supply E2 into a DC voltage having a voltage value adapted to the load 50 and supplies the DC voltage to the load 50.

The first semiconductor switch Q1 is inserted into the main power supply line LN1. Specifically, the first semiconductor switch Q1 has its drain electrically connected to the input terminal P1 and its source electrically connected to the output terminal P2. The first semiconductor switch Q1 is an MISFET and may be, for example, a P-channel metal-oxide semiconductor field effect transistor (MOSFET) in this embodiment. The first semiconductor switch Q1 has its ON/OFF states switched by the first driving unit 12. Depending on the ON/OFF state of the first semiconductor switch Q1, the main power supply line LN1 is switched to either an electrically conductive state or an electrically non-conductive state in the direction in which a current flows from the load 50 to the main power supply E1. In this embodiment, the first semiconductor switch Q1 includes a parasitic diode. Thus, the first semiconductor switch Q1 cannot block the current flowing from the main power supply E1 toward the load 50, and therefore, power may be supplied from the main power supply E1 to the load 50 in the non-failure state. In this embodiment, the first semiconductor switch Q1 is configured to be able to cut off a current flowing in one direction. Alternatively, the first semiconductor switch Q1 may also be configured to be able to cut off currents flowing bidirectionally.

The auxiliary power supply switch Q5 is electrically connected between the voltage step down circuit 40 and the confluent node P4. The auxiliary power supply switch Q5 may be, for example, an electromagnetic relay and has its ON/OFF states switched by the second driving unit 13.

The failure detection unit 11 determines whether the main power supply E1 is in the failure state or the non-failure state. The failure detection unit 11 detects, based on the voltage value of the output voltage V1 of the main power supply E1, either the failure state or the non-failure state. Specifically, the failure detection unit 11 includes a comparator CP1 for comparing the voltage supplied from the main power supply E1 to the input terminal P1 (i.e., the output voltage V1 of the main power supply E1) with a reference voltage V2. The reference voltage V2 is a threshold value for determining whether the main power supply E1 is in the failure state or the non-failure state. In the non-failure state, the output voltage V1 becomes equal to or higher than the reference voltage V2 and the output voltage of the comparator CP1 comes to have a low voltage level. On the other hand, in the failure state, the output voltage V1 becomes lower than the reference voltage V2 and the output voltage of the comparator CP1 comes to have a high voltage level. The output terminal of the comparator CP1 is connected to the gate of a fourth semiconductor switch Q4 included in the first driving unit 12.

The first driving unit 12 includes a voltage divider circuit 15, the second semiconductor switch Q2, and the fourth semiconductor switch Q4.

The voltage divider circuit 15 includes a series circuit of a resistor R1 as a first impedance element and a resistor R2 as a second impedance element. That is to say, the voltage divider circuit 15 includes a series circuit of the resistors R1, R2 connected between the source of the first semiconductor switch Q1 and the reference potential of the main power supply E1 (i.e., the reference potential of the backup power supply control system 10). The connection node between the resistors R1, R2 is connected to the gate of the first semiconductor switch Q1. That is to say, the resistor R1 as the first impedance element is connected between the gate and source of the first semiconductor switch Q1 and the resistor R2 as the second impedance element is connected between the gate of the first semiconductor switch Q1 and the reference potential of the main power supply E1. Thus, a voltage generated by dividing the output voltage V1 of the main power supply E1 by the resistors R1, R2 (i.e., the voltage across the resistor R1) is applied to between the gate and source of the first semiconductor switch Q1.

In addition, a diode D1 is also connected in parallel with the resistor R2 having the lower potential. The diode D1 has its cathode connected to the gate of the first semiconductor switch Q1 and has its anode connected to the reference potential of the main power supply E1. Providing the diode D1 allows an electrical discharge path, along which electric charge flows from the reference potential to the source of the first semiconductor switch Q1 via the diode D1, to be formed. This allows, when the main power supply E1 causes a failure due to short circuit, the electric charge stored in the gate-source capacitance of the first semiconductor switch Q1 to be transferred through the electrical discharge path including the diode D1. In addition, the gate potential of the first semiconductor switch Q1 is clamped at a voltage lower by the forward bias voltage of the diode D1 than the reference potential. This ensures the drive voltage for the second semiconductor switch Q2 by at least the gate-plateau voltage Vp of the first semiconductor switch Q1. This enables, when the main power supply E1 causes a failure, turning the second semiconductor switch Q2 from OFF to ON and turning the first semiconductor switch Q1 from ON to OFF in a short time using at least the gate-plateau voltage Vp as the drive voltage.

In this case, to reduce the dark current in the non-failure state, a combined resistance value of the resistors R1, R2 is preferably set at a resistance value on the order of a few MΩ. Also, the impedance value of the resistor R1 as the first impedance element is set at a value larger than the impedance value of the resistor R2 as the second impedance element. Note that to make the gate-source voltage of the first semiconductor switch Q1 greater than the threshold voltage, the resistance value of the resistor R1 is preferably set at a value a few ten to several hundred times as high as the resistance value of the resistor R2. In this embodiment, the voltage divider circuit 15 is implemented as a series circuit of the resistor R1 as the first impedance element and the resistor R2 as the second impedance element. However, the first impedance element and the second impedance element do not have to be the resistors R1, R2 but may be changed as appropriate.

The second semiconductor switch Q2 is connected between the gate and source of the first semiconductor switch Q1. The second semiconductor switch Q2 is an MISFET and may be for example, a P-channel MOSFET in this embodiment. The second semiconductor switch Q2 has its source connected to the source of the first semiconductor switch Q1 and has its drain connected to the gate of the first semiconductor switch Q1. A resistor R3 is connected between the gate and source of the second semiconductor switch Q2. In addition, the second semiconductor switch Q2 has its gate connected to the drain of the fourth semiconductor switch Q4 as an N-channel MOSFET and the fourth semiconductor switch Q4 has its source connected to the reference potential of the main power supply E1. The fourth semiconductor switch Q4 has its gate connected to the output terminal of the comparator CP1. The fourth semiconductor switch Q4 has its ON/OFF states switched depending on the output of the failure detection unit 11. The fourth semiconductor switch Q4 turns OFF in the non-failure state and turns ON in the failure state.

The ON/OFF detection unit 14 determines whether the first semiconductor switch Q1 is ON or OFF. The ON/OFF detection unit 14 includes a third semiconductor switch Q3 and a resistor R4. The third semiconductor switch Q3 is an MISFET and may be a P-channel MOSFET as well as the first semiconductor switch Q1 in this embodiment. The first semiconductor switch Q1 and the third semiconductor switch Q3 have their respective sources connected to each other and have their respective gates connected to each other. The third semiconductor switch Q3 has its drain connected to the reference potential of the main power supply E1 via the resistor R4. Note that as the third semiconductor switch Q3, a MOSFET having a lower turn OFF voltage than the first semiconductor switch Q1 may be used. That is to say, the threshold voltage Vth3 when the third semiconductor switch Q3 turns from ON to OFF is equal to or lower than the threshold voltage Vth1 when the first semiconductor switch Q1 turns from ON to OFF.

A voltage corresponding to the gate-source voltage of the first semiconductor switch Q1 is applied to between the gate and source of the third semiconductor switch Q3. In this embodiment, substantially the same voltage as the gate-source voltage of the first semiconductor switch Q1 is applied to between the gate and source of the third semiconductor switch Q3. As used herein, if two voltages are substantially the same voltages, this expression refers to not only a situation where the two voltages are exactly the same but also a situation where the difference between the two voltages is equal to or less than a predetermined tolerance. The ON/OFF detection unit 14 detects the ON/OFF state of the first semiconductor switch Q1 indirectly based on the ON/OFF state of the third semiconductor switch Q3 and provides an output signal, of which the signal level represents the ON/OFF state of the first semiconductor switch Q1, to the second driving unit 13. In this embodiment, the ON/OFF detection unit 14 provides a high output signal to the second driving unit 13 if the third semiconductor switch Q3 is in ON state and provides low output signal to the second driving unit 13 if the third semiconductor switch Q3 is in OFF state.

The second driving unit 13 includes a NOT gate N1. The input terminal of the NOT gate N1 receives, as the output signal of the ON/OFF detection unit 14, a voltage signal at a connection node P5 between the third semiconductor switch Q3 and the resistor R4. If the third semiconductor switch Q3 is ON in the non-failure state, then the voltage signal at the connection node P5 comes to have a high voltage level, and therefore, the output terminal of the NOT gate N1 comes to have a low voltage level. At this time, the auxiliary power supply switch Q5 turns OFF to make the auxiliary power supply line LN2 electrically non-conductive. On the other hand, if the third semiconductor switch Q3 turns OFF in the failure state, then the voltage signal at the connection node P5 comes to have a low voltage level, and therefore, the output terminal of the NOT gate N1 comes to have a high voltage level. At this time, the auxiliary power supply switch Q5 turns ON to make the auxiliary power supply line LN2 electrically conductive.

That is to say, when the ON/OFF detection unit 14 detects that the first semiconductor switch Q1 is ON, the second driving unit 13 controls the auxiliary power supply switch Q5 OFF. On the other hand, when the ON/OFF detection unit 14 detects that the first semiconductor switch Q1 is OFF, the second driving unit 13 controls the auxiliary power supply switch Q5 ON.

The backup power supply system 1 includes the backup power supply control system 10 and the auxiliary power supply E2. In this embodiment, the backup power supply system 1 further includes the charger circuit 30 and the voltage step down circuit 40. Note that the charger circuit 30 and the voltage step down circuit 40 are not essential constituent elements for the backup power supply system 1 but may be omitted as appropriate.

The charger circuit 30 may be, for example, a dropper type charger circuit. The charger circuit 30 uses the main power supply E1 as a power supply to supply a charging current to the auxiliary power supply E2 and thereby charge the auxiliary power supply E2.

The voltage step down circuit 40 may be, for example, a voltage step down chopper type power supply circuit. The voltage step down circuit 40 steps down the output voltage of the auxiliary power supply E2, transforms the output voltage into a DC voltage having a voltage value adapted to the load 50, and supplies the DC voltage to the load 50.

(2.2) Description of Operation

Next, a main operation of the backup power supply system 1 will be described with reference to the accompanying drawings.

(2.2.1) Non-Failure State of Main Power Supply

In the non-failure state where the main power supply E1 causes no failure, the output voltage of the comparator CP1 comes to have a low voltage level to turn the fourth semiconductor switch Q4 OFF. If the fourth semiconductor switch Q4 is OFF, then no potential difference is caused between the gate and source of the second semiconductor switch Q2 to turn the second semiconductor switch Q2 OFF.

At this time, a voltage, generated by dividing the output voltage V1 of the main power supply E1 by the voltage divider circuit 15, is applied between the gate and source of the first semiconductor switch Q1 to turn the first semiconductor switch Q1 ON and make the main power supply line LN1 electrically conductive. Thus, power is supplied from the main power supply E1 to the load 50 through the main power supply line LN1.

In addition, a voltage, generated by dividing the output voltage V1 of the main power supply E1 by the voltage divider circuit 15, is also applied between the gate and source of the third semiconductor switch Q3 to turn the third semiconductor switch Q3 ON. At this time, the output voltage of the NOT gate N1 comes to have a low voltage level to turn the auxiliary power supply switch Q5 OFF and thereby make the auxiliary power supply line LN2 electrically non-conductive.

As a result, when the main power supply E1 is in the non-failure state, the main power supply line LN1 becomes electrically conductive and the auxiliary power supply line LN2 becomes electrically non-conductive, and therefore, power is supplied from the main power supply E1 to the load 50 through the main power supply line LN1. In addition, power is also supplied from the main power supply E1 to the charger circuit 30 through the branch line LN3 to make the charger circuit 30 charge the auxiliary power supply E2. Note that when the main power supply E1 is in the non-failure state, the auxiliary power supply line LN2 is electrically non-conductive, and therefore, no power is supplied from the auxiliary power supply E2 to the load 50.

(2.2.2) Failure State of Main Power Supply

In the failure state where the main power supply E1 has caused a failure, the output voltage of the comparator CP1 comes to have a high voltage level to turn the fourth semiconductor switch Q4 ON. In the failure state, the output voltage V1 of the main power supply E1 decreases to less than the reference voltage V2. Immediately after the failure has been caused, a residual voltage is generated in the load 50 due to a capacitive component included in the load 50. Thus, the first driving unit 12 ensures, as a drive voltage for the second semiconductor switch Q2, the gate-plateau voltage Vp of the first semiconductor switch Q1, the residual voltage of the capacitor C1, or the residual voltage generated in the capacitive component of the load 50. Thus, when the fourth semiconductor switch Q4 turns ON, the first driving unit 12 controls the second semiconductor switch Q2 ON by using, as the drive voltage, the gate-plateau voltage Vp of the first semiconductor switch Q1, the residual voltage of the capacitor C1, or the residual voltage of the load 50.

When the second semiconductor switch Q2 turns ON, the gate and source of the first semiconductor switch Q1 are short-circuited by the second semiconductor switch Q2, thus causing a steep decrease in the gate-source voltage Vgs of the first semiconductor switch Q1. Then, when the gate-source voltage Vgs of the first semiconductor switch Q1 becomes lower than the threshold voltage Vth1, the first semiconductor switch Q1 turns from ON to OFF and switches the main power supply line LN1 from the electrically conductive state to the electrically non-conductive state.

In this case, the same voltage as the gate-source voltage Vgs of the first semiconductor switch Q1 is applied to between the gate and source of the third semiconductor switch Q3. The turn OFF voltage of the third semiconductor switch Q3 (threshold voltage Vth3) is lower than the turn OFF voltage of the first semiconductor switch Q1 (threshold voltage Vth1). Thus, the third semiconductor switch Q3 turns OFF after the first semiconductor switch Q1 has turned OFF. When the third semiconductor switch Q3 turns OFF, the output voltage of the NOT gate N1 comes to have a high voltage level to turn the auxiliary power supply switch Q5 ON. Thus, the auxiliary power supply line LN2 switches from the electrically non-conductive state to the electrically conductive state. Consequently, power is supplied from the auxiliary power supply E2 to the load 50 through the auxiliary power supply line LN2.

In addition, the main power supply line LN1 has switched to the electrically non-conductive state before the auxiliary power supply line LN2 switches to the electrically conductive state. This enables supplying power from the auxiliary power supply E2 to the load 50 with reliability without supplying the output power of the auxiliary power supply E2 to the circuit on the main power supply E1 side through the main power supply line LN1.

Meanwhile, in a driver circuit in which a first resistor and a second resistor are connected between the gate and source of the first semiconductor switch Q1 and in which the second resistor and a switch are connected between the gate and a reference potential, the first semiconductor switch Q1 is turned OFF by turning the switch OFF and transferring the electric charge stored in the gate capacitance of the first semiconductor switch Q1 to the first resistor and the second resistor. Also, if the control operation is performed to turn the auxiliary power supply switch Q5 ON after a predetermined time has passed since the driver circuit has turned the switch from OFF to ON, then the predetermined time needs to be set at a maximum value of the time it takes to turn the first semiconductor switch Q1 from ON to OFF (hereinafter referred to as a "switching time") with a dispersion in electrical discharge time constant taken into account. If the predetermined time is set longer than the actual switching time, the start of supplying power from the auxiliary power supply E2 to the load 50 is delayed significantly, thus making the period in which no power is supplied to the load 50 too long.

In this embodiment, after the ON/OFF detection unit 14 has detected the OFF state of the first semiconductor switch Q1 by detecting that the third semiconductor switch Q3 is in the OFF state, the auxiliary power supply switch Q5 is turned ON. This enables shortening the time it takes to turn the auxiliary power supply switch Q5 ON since the first semiconductor switch Q1 has turned OFF. Consequently, the period in which no power is supplied to the load 50 when the main power supply E1 has caused a failure may be shortened.

In the backup power supply control system 10 according to this embodiment, even if the output terminal on the negative electrode side of the main power supply E1 is connected by mistake to the input terminal P1, the first semiconductor switch Q1 still remains OFF, and therefore, a DC voltage of the opposite polarity is never applied to the load 50.

Furthermore, in a state where main power supply E1 is connected to the backup power supply control system 10 properly while making no mistakes in connection between positive and negative electrode terminals, if the user removes the main power supply E1 once and then re-connects the main power supply E1 while making a mistake in connection between the positive and negative electrode terminals, then it takes several milliseconds to remove the main power supply E1 once and then re-connect the main power supply E1. According to this embodiment, once the main power supply E1 has been removed, the failure detection unit 11 detects the failure state to turn both the fourth semiconductor switch Q4 and the second semiconductor switch Q2 ON. This allows the first semiconductor switch Q1 to turn OFF within several milliseconds. Thus, this enables, if the main power supply E1 is re-connected with the positive and negative electrode terminals connected in a wrong direction, preventing a DC voltage of the opposite polarity from being applied by mistake to the load 50, since the first semiconductor switch Q1 has already been turned OFF.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure.

Next, variations of the exemplary embodiment will be enumerated one after another. Note that the variations to be described below may be adopted in combination as appropriate.

In the exemplary embodiment described above, a circuit configuration for the failure detection unit 11, the first driving unit 12, the second driving unit 13, and the ON/OFF detection unit 14, and other constituent elements is only an example and may be changed as appropriate.

Also, in the exemplary embodiment described above, the backup power supply control system 10 includes a part of the main power supply line LN1. However, the backup power supply control system 10 does not have to include a part of the main power supply line LN1. Alternatively, the backup power supply control system 10 may also be configured to switch a main power supply line LN1, provided outside of the backup power supply control system 10, to either the electrically conductive state or electrically non-conductive state by turning ON and OFF the first semiconductor switch Q1 connected to the main power supply line LN1.

Furthermore, in the exemplary embodiment described above, the turn OFF voltage of the third semiconductor switch Q3 (i.e., the threshold voltage Vth3) is lower than the turn OFF voltage of the first semiconductor switch Q1 (i.e., the threshold voltage Vth1). Alternatively, the threshold voltage Vth3 may be equal to or lower than the threshold voltage Vth1. Thus, either simultaneously with, or after, turn OFF of the first semiconductor switch Q1, the third semiconductor switch Q3 turns OFF and the auxiliary power supply switch Q5 turns ON. This enables switching the auxiliary power supply line LN2 from the electrically non-conductive state to the electrically conductive state either simultaneously with, or after, the switch of the main power supply line LN1 from the electrically conductive state to the electrically non-conductive state.

Furthermore, in the exemplary embodiment described above, the auxiliary power supply switch Q5 is implemented as an electromagnetic relay. However, the auxiliary power supply switch Q5 does not have to be an electromagnetic relay. Alternatively, the auxiliary power supply switch Q5 may also be a semiconductor switch such as a MOSFET, a triac, or an insulated gate bipolar transistor (IGBT).

Furthermore, in the exemplary embodiment described above, the first semiconductor switch Q1 is implemented as a single P-channel MOSFET and configured to be switchable from the electricity conductive state to electrically non-conductive state, or vice versa, in the direction in which a current flows from the load 50 to the main power supply E1. Alternatively, the first semiconductor switch Q1 may also be configured to be switchable from the electrically conductive state to electrically non-conductive state, or vice versa, bidirectionally. For example, the first semiconductor switch Q1 may also be implemented as a series circuit of two MOSFETs, of which the respective sources are connected to each other, and may be configured to be switchable between the electrically conductive and non-conductive states bidirectionally.

(Recapitulation)

As can be seen from the foregoing description, a backup power supply control system (10) according to a first aspect includes a first semiconductor switch (Q1), an auxiliary power supply switch (Q5), a failure detection unit (11), a first driving unit (12), and a second driving unit (13). The first semiconductor switch (Q1) switches a main power supply line (LN1), connecting a main power supply (E1) to a load (50), to either an electrically conductive state or an electrically non-conductive state. The auxiliary power supply switch (Q5) switches an auxiliary power supply line (LN2), connecting an auxiliary power supply (E2) to the load (50), to either the electrically conductive state or the electrically non-conductive state. The failure detection unit (11) determines whether the main power supply (E1) is in a failure state or a non-failure state. The first driving unit (12) controls, in the non-failure state, the first semiconductor switch (Q1) ON and controls, in the failure state, the first semiconductor switch (Q1) OFF. The second driving unit (13) controls, in the non-failure state, the auxiliary power supply switch (Q5) OFF and controls, in the failure state, the auxiliary power supply switch (Q5) ON. The first semiconductor switch (Q1) is an MISFET. The first driving unit (12) includes: a voltage divider circuit (15) that divides a voltage on the main power supply line (LN1) and applies the voltage thus divided to between a gate and source of the first semiconductor switch (Q1); and a second semiconductor switch (Q2) connected between the gate and source of the first semiconductor switch (Q1). When the failure detection unit (11) has detected the non-failure state, the first driving unit (12) controls the second semiconductor switch (Q2) OFF and thereby controls the first semiconductor switch (Q1) ON. The first driving unit (12) ensures, in the failure state, at least a gate-plateau voltage of the first semiconductor switch (Q1) as a drive voltage for the second semiconductor switch (Q2). When the failure detection unit (11) detects the failure state, the first driving unit (12) controls the second semiconductor switch (Q2) ON and thereby controls the first semiconductor switch (Q1) OFF.

According to this aspect, even if the main power supply (E1) has caused a failure, the first driving unit (12) controls the second semiconductor switch (Q2) ON using at least a gate-plateau voltage as a drive voltage, thus enabling turning the first semiconductor switch (Q1) from ON to OFF by short-circuiting the gate and source of the first semiconductor switch (Q1). In addition, the first driving unit (12) controls the second semiconductor switch (Q2) ON and controls the first semiconductor switch (Q1) OFF by short-circuiting the gate and source of the first semiconductor switch (Q1) with the second semiconductor switch (Q2), thus enabling shortening the time it takes to turn the first semiconductor switch (Q1) OFF since the main power supply (E1) has caused a failure. This enables providing a backup power supply control system (10) having the ability to shorten the time it takes to make power suppliable from the auxiliary power supply (E2) to the load (50) when the main power supply (E1) has caused a failure.

A backup power supply control system (10) according to a second aspect, which may be implemented in conjunction with the first aspect, further includes an ON/OFF detection unit (14) that detects that the first semiconductor switch (Q1) is in either an ON state or an OFF state. When the ON/OFF detection unit (14) detects that the first semiconductor switch (Q1) is in the ON state, the second driving unit (13) controls the auxiliary power supply switch (Q5) OFF. When the ON/OFF detection unit (14) detects that the first semiconductor switch (Q1) is in the OFF state, the second driving unit (13) controls the auxiliary power supply switch (Q5) ON.

According to this aspect, the auxiliary power supply switch (Q5) is controlled ON after the first semiconductor switch (Q1) has turned OFF, thus substantially preventing the output power of the auxiliary power supply (E2) from being supplied to a circuit on the main power supply (E1) side. This reduces the chances of causing a decrease in the power supplied from the auxiliary power supply (E2) to the load (50).

In a backup power supply control system (10) according to a third aspect, which may be implemented in conjunction with the second aspect, the ON/OFF detection unit (14)

includes a third semiconductor switch (Q3) implemented as an MISFET. A voltage corresponding to a gate-source voltage of the first semiconductor switch (Q1) is applied to between a gate and source of the third semiconductor switch (Q3). The ON/OFF detection unit (14) detects an ON/OFF state of the first semiconductor switch (Q1) based on an ON/OFF state of the third semiconductor switch (Q3).

This aspect allows the ON/OFF detection unit (14) to detect the ON/OFF state of the first semiconductor switch (Q1) indirectly based on the ON/OFF state of the third semiconductor switch (Q3).

In a backup power supply control system (10) according to a fourth aspect, which may be implemented in conjunction with the third aspect, the first semiconductor switch (Q1) and the third semiconductor switch (Q3) have their respective gates electrically connected to each other and also have their respective sources electrically connected to each other. A threshold voltage (Vth3) at which the third semiconductor switch (Q3) turns from ON to OFF is equal to or lower than a threshold voltage (Vth1) at which the first semiconductor switch (Q1) turns from ON to OFF.

This aspect allows, even if the threshold voltage (Vht1) of the first semiconductor switch (Q1) varies, the ON/OFF detection unit (14) to detect the OFF state of the first semiconductor switch (Q1) with more reliability because the third semiconductor switch (Q3) is in OFF state.

In a backup power supply control system (10) according to a fifth aspect, which may be implemented in conjunction with any one of the first to fourth aspects, the second semiconductor switch (Q2) is an MISFET having a source connected to the source of the first semiconductor switch (Q1) and a drain connected to the gate of the first semiconductor switch (Q1). The first driving unit (12) further includes a resistor (R3) and a fourth semiconductor switch (Q4). The resistor (R3) is connected between the gate and source of the second semiconductor switch (Q2). The fourth semiconductor switch (Q4) is connected between the gate of the second semiconductor switch (Q2) and a reference potential and turns OFF in the non-failure state and turns ON in the failure state.

This aspect enables turning the second semiconductor switch (Q2) ON and turning the first semiconductor switch (Q1) OFF by turning the fourth semiconductor switch (Q4) of the first driving unit (12) ON.

In a backup power supply control system (10) according to a sixth aspect, which may be implemented in conjunction with any one of the first to fifth aspects, the voltage divider circuit (15) includes: a first impedance element (R1) connected between the gate and source of the first semiconductor switch (Q1); and a second impedance element (R2) connected between the gate of the first semiconductor switch (Q1) and a reference potential of the main power supply (E1). An impedance value of the first impedance element (R1) is larger than an impedance value of the second impedance element (R2).

According to this aspect, when the main power supply (E1) is in the non-failure state, the voltage divider circuit (15) applies a voltage greater than the threshold voltage (Vth1) to between the gate and source of the first semiconductor switch (Q1), thus enabling turning the first semiconductor switch (Q1) ON.

A backup power supply control system (10) according to a seventh aspect, which may be implemented in conjunction with the sixth aspect, further includes a diode (D1) having a cathode connected to the gate of the first semiconductor switch (Q1) and an anode connected to the reference potential.

According to this aspect, even if a gate-plateau voltage of the first semiconductor switch (Q1) is generated in a situation where the main power supply (E1) has caused a failure, the gate potential of the first semiconductor switch (Q1) may also be clamped at a voltage lower than the reference potential by the forward bias voltage of the diode (D1). This enables controlling the second semiconductor switch (Q2) ON with a drive voltage including at least the gate-plateau voltage of the first semiconductor switch (Q1).

In a backup power supply control system (10) according to an eighth aspect, which may be implemented in conjunction with any one of the first to seventh aspects, the first semiconductor switch (Q1) is a P-channel MOSFET.

This aspect enables providing a backup power supply control system (10) having the ability to shorten the time it takes to make power suppliable from the auxiliary power supply (E2) to the load (50) when the main power supply (E1) has caused a failure.

A backup power supply system (1) according to a ninth aspect includes the backup power supply control system (10) according to any one of the first to eighth aspects and the auxiliary power supply (E2). The backup power supply control system (10) makes power suppliable from the auxiliary power supply (E2) to the load (50) when the main power supply (E1) is in the failure state.

This aspect enables providing a backup power supply system (1) having the ability to shorten the time it takes to make power suppliable from the auxiliary power supply (E2) to the load (50) when the main power supply (E1) has caused a failure.

In a backup power supply system (1) according to a tenth aspect, which may be implemented in conjunction with the ninth aspect, the auxiliary power supply (E2) includes an electrical double layer capacitor.

This aspect enables providing a backup power supply system (1) with an auxiliary power supply (E2) including an electrical double layer capacitor.

A backup power supply system (1) according to an eleventh aspect, which may be implemented in conjunction with the ninth or tenth aspect, further includes a charger circuit (30) that charges the auxiliary power supply (E2) with power supplied from the main power supply (E1).

This aspect enables, when the main power supply (E1) is in the non-failure state, supplying power from the main power supply (E1) to the load (50) and charging the auxiliary power supply (E2). This aspect also enables, when the main power supply (E1) is in the failure state, supplying power from the auxiliary power supply (E2) to the load (50).

A moving vehicle (100) according to a twelfth aspect includes the backup power supply system (1) according to any one of the ninth to eleventh aspects and a moving vehicle body (101). The moving vehicle body (101) is to be equipped with the backup power supply system (1) and the load (50).

This aspect enables providing a moving vehicle (100) including the backup power supply system (1) having the ability to shorten the time it takes to make power suppliable from the auxiliary power supply (E2) when the main power supply (E1) has caused a failure.

Note that the constituent elements according to the second to eighth aspects are not essential constituent elements for the backup power supply control system (10) but may be omitted as appropriate. Also, the constituent elements according to the tenth and eleventh aspects are not essential constituent elements for the backup power supply system (1) but may be omitted as appropriate.

REFERENCE SIGNS LIST

1 Backup Power Supply System
10 Backup Power Supply Control System
11 Failure Detection Unit
12 First Driving Unit
13 Second Driving Unit
14 ON/OFF Detection Unit
15 Voltage Divider Circuit
30 Charger Circuit
50 Load
100 Vehicle (Moving Vehicle)
101 Body (Moving Vehicle Body)
D1 Diode
E1 Main Power Supply
E2 Auxiliary Power Supply
LN1 Main Power Supply Line
LN2 Auxiliary Power Supply Line
Q1 First Semiconductor Switch
Q2 Second Semiconductor Switch
Q3 Third Semiconductor Switch
Q4 Fourth Semiconductor Switch
Q5 Auxiliary Power Supply Switch
R1 Resistor (First Impedance Element)
R2 Resistor (Second Impedance Element)
R3 Resistor
Vth1, Vth3 Threshold Voltage

The invention claimed is:

1. A backup power supply control system comprising:
a first semiconductor switch configured to switch a main power supply line to either an electrically conductive state or an electrically non-conductive state, the main power supply line connecting a main power supply to a load;
an auxiliary power supply switch configured to switch an auxiliary power supply line to either the electrically conductive state or the electrically non-conductive state, the auxiliary power supply line connecting an auxiliary power supply to the load;
a failure detection unit configured to determine whether the main power supply is in a failure state or a non-failure state;
a first driving unit configured to control, in the non-failure state, the first semiconductor switch ON and control, in the failure state, the first semiconductor switch OFF; and
a second driving unit configured to control, in the non-failure state, the auxiliary power supply switch OFF and control, in the failure state, the auxiliary power supply switch ON,
the first semiconductor switch being an MISFET,
the first driving unit including: a voltage divider circuit configured to divide a voltage on the main power supply line and apply the voltage thus divided to between a gate and source of the first semiconductor switch; and a second semiconductor switch connected between the gate and source of the first semiconductor switch,
the first driving unit being configured to, when the failure detection unit detects the non-failure state, control the second semiconductor switch OFF and thereby control the first semiconductor switch ON,
the first driving unit being configured to ensure, in the failure state, at least a gate-plateau voltage of the first semiconductor switch as a drive voltage for the second semiconductor switch,
the first driving unit being configured to, when the failure detection unit detects the failure state, control the second semiconductor switch ON and thereby control the first semiconductor switch OFF.

2. The backup power supply control system of claim 1, further comprising an ON/OFF detection unit configured to detect that the first semiconductor switch is in either an ON state or an OFF state, wherein
the second driving unit is configured to, when the ON/OFF detection unit detects that the first semiconductor switch is in the ON state, control the auxiliary power supply switch OFF, and
the second driving unit is configured to, when the ON/OFF detection unit detects that the first semiconductor switch is in the OFF state, control the auxiliary power supply switch ON.

3. The backup power supply control system of claim 2, wherein
the ON/OFF detection unit includes a third semiconductor switch implemented as an MISFET,
a voltage corresponding to a gate-source voltage of the first semiconductor switch is applied to between a gate and source of the third semiconductor switch, and
the ON/OFF detection unit is configured to detect an ON/OFF state of the first semiconductor switch based on an ON/OFF state of the third semiconductor switch.

4. The backup power supply control system of claim 3, wherein
the first semiconductor switch and the third semiconductor switch have their respective gates electrically connected to each other and also have their respective sources electrically connected to each other, and
a threshold voltage at which the third semiconductor switch turns from ON to OFF is equal to or lower than a threshold voltage at which the first semiconductor switch turns from ON to OFF.

5. The backup power supply control system of claim 1, wherein
the second semiconductor switch is an MISFET having a source connected to the source of the first semiconductor switch and having a drain connected to the gate of the first semiconductor switch, and
the first driving unit further includes:
a resistor connected between the gate and source of the second semiconductor switch; and
a fourth semiconductor switch connected between the gate of the second semiconductor switch and a reference potential and configured to turn OFF in the non-failure state and turn ON in the failure state.

6. The backup power supply control system of claim 1, wherein
the voltage divider circuit includes: a first impedance element connected between the gate and source of the first semiconductor switch; and a second impedance element connected between the gate of the first semiconductor switch and a reference potential of the main power supply, and
an impedance value of the first impedance element is larger than an impedance value of the second impedance element.

7. The backup power supply control system of claim 6, further comprising a diode having a cathode connected to the gate of the first semiconductor switch and an anode connected to the reference potential.

8. The backup power supply control system of claim 1, wherein
the first semiconductor switch is a P-channel MOSFET.

9. A backup power supply system comprising:
the backup power supply control system of claim 1; and
the auxiliary power supply,
the backup power supply control system being configured to make power suppliable from the auxiliary power supply to the load when the main power supply is in the failure state.

10. The backup power supply system of claim 9, wherein the auxiliary power supply includes an electrical double layer capacitor.

11. The backup power supply system of claim 9, further comprising a charger circuit configured to charge the auxiliary power supply with power supplied from the main power supply.

12. A moving vehicle comprising:
the backup power supply system of claim 9; and
a moving vehicle body to be equipped with the backup power supply system and the load.

13. The backup power supply control system of claim 2, wherein
the second semiconductor switch is an MISFET having a source connected to the source of the first semiconductor switch and having a drain connected to the gate of the first semiconductor switch, and
the first driving unit further includes:
a resistor connected between the gate and source of the second semiconductor switch; and
a fourth semiconductor switch connected between the gate of the second semiconductor switch and a reference potential and configured to turn OFF in the non-failure state and turn ON in the failure state.

14. The backup power supply control system of claim 3, wherein
the second semiconductor switch is an MISFET having a source connected to the source of the first semiconductor switch and having a drain connected to the gate of the first semiconductor switch, and
the first driving unit further includes:
a resistor connected between the gate and source of the second semiconductor switch; and
a fourth semiconductor switch connected between the gate of the second semiconductor switch and a reference potential and configured to turn OFF in the non-failure state and turn ON in the failure state.

15. The backup power supply control system of claim 4, wherein
the second semiconductor switch is an MISFET having a source connected to the source of the first semiconductor switch and having a drain connected to the gate of the first semiconductor switch, and
the first driving unit further includes:
a resistor connected between the gate and source of the second semiconductor switch; and
a fourth semiconductor switch connected between the gate of the second semiconductor switch and a reference potential and configured to turn OFF in the non-failure state and turn ON in the failure state.

16. The backup power supply control system of claim 2, wherein
the voltage divider circuit includes: a first impedance element connected between the gate and source of the first semiconductor switch; and a second impedance element connected between the gate of the first semiconductor switch and a reference potential of the main power supply, and
an impedance value of the first impedance element is larger than an impedance value of the second impedance element.

17. The backup power supply control system of claim 3, wherein
the voltage divider circuit includes: a first impedance element connected between the gate and source of the first semiconductor switch; and a second impedance element connected between the gate of the first semiconductor switch and a reference potential of the main power supply, and
an impedance value of the first impedance element is larger than an impedance value of the second impedance element.

18. The backup power supply control system of claim 4, wherein
the voltage divider circuit includes: a first impedance element connected between the gate and source of the first semiconductor switch; and a second impedance element connected between the gate of the first semiconductor switch and a reference potential of the main power supply, and
an impedance value of the first impedance element is larger than an impedance value of the second impedance element.

19. The backup power supply control system of claim 5, wherein
the voltage divider circuit includes: a first impedance element connected between the gate and source of the first semiconductor switch; and a second impedance element connected between the gate of the first semiconductor switch and a reference potential of the main power supply, and
an impedance value of the first impedance element is larger than an impedance value of the second impedance element.

20. The backup power supply control system of claim 16, further comprising a diode having a cathode connected to the gate of the first semiconductor switch and an anode connected to the reference potential.

* * * * *